(12) United States Patent
Wang et al.

(10) Patent No.: US 7,590,195 B2
(45) Date of Patent: Sep. 15, 2009

(54) REDUCED-COMPLEXITY MULTIPLE-INPUT MULTIPLE-OUTPUT (MIMO) CHANNEL DETECTION VIA SEQUENTIAL MONTE CARLO

(75) Inventors: Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 354 days.

(21) Appl. No.: 11/063,633

(22) Filed: Feb. 23, 2005

(65) Prior Publication Data

US 2006/0188044 A1   Aug. 24, 2006

(51) Int. Cl.
  *H04L 27/06* (2006.01)
(52) U.S. Cl. .................. 375/340; 375/267; 375/367; 375/316; 375/346; 375/260
(58) Field of Classification Search .......... 375/347, 375/367, 316, 346
See application file for complete search history.

(56) References Cited

U.S. PATENT DOCUMENTS

| | | | |
|---|---|---|---|
| 7,317,770 B2 * | 1/2008 | Wang | 375/340 |
| 2004/0042556 A1 * | 3/2004 | Medvedev et al. | 375/260 |
| 2004/0174939 A1 * | 9/2004 | Wang | 375/316 |
| 2004/0204922 A1 * | 10/2004 | Beadle et al. | 702/189 |
| 2005/0195734 A1 * | 9/2005 | Sandell et al. | 370/208 |
| 2005/0238111 A1 * | 10/2005 | Wallace et al. | 375/267 |
| 2006/0088111 A1 * | 4/2006 | Ye et al. | 375/260 |
| 2006/0109938 A1 * | 5/2006 | Challa et al. | 375/347 |
| 2007/0081582 A1 * | 4/2007 | Ginis et al. | 375/222 |

OTHER PUBLICATIONS

Kim et al., A Sequential Monte-Carlo Kalman Filter based Delay and Channel Estimation Method in the MIMO-OFDM System, IEEE Vehicular Technology Conference, 2004. VTC2004-Fall. 2004 IEEE 60th, Publication Date: Sep. 26-29, 2004, vol. 1, on pp. 573-577 vol. 1.*

Guo et al., Blind detection in MIMO systems via sequential Monte Carlo, Selected Areas in Communications, IEEE Journal on, Publication Date: Apr. 2003, vol. 21, Issue: 3, on pp. 464-473.*

Yang et al., A Sequential Monte Carlo Blind Receiver for OFDM Systems in Frequency-Selective Fading Channels, IEEE Trans. Sig. Proc., vol. 50, No. 2, p. 217-280, Feb. 2002.*

Foschini, G.J. et al., "On limits of Wireless Communications in a Fading Environment When Using Multiple Antennas", Wireless Personal Commun., 6(3):311-335, 1998.

Telatar, I.E., "Capacity of Multi-Antenna Gaussian Channels", Eur. Trans. Telecommun., 10(6):585-595, 1999.

(Continued)

*Primary Examiner*—Shuwang Liu
*Assistant Examiner*—Kenneth Lam
(74) *Attorney, Agent, or Firm*—Joseph J. Kolodka

(57) ABSTRACT

A detection system and method are disclosed which uses sequential Monte Carlo techniques in a multiple-input multiple-output system. The detection system and method samples a first and second component of the modulation symbols separately, thereby reducing the number of symbol candidates and the computational complexity of the system.

6 Claims, 4 Drawing Sheets

OTHER PUBLICATIONS

Chuah, C.N. et al., "Capacity Scaling in MIMO Wireless Systems Under Correlated Fading", IEEE Trans. Inform. Theory, 48(3): 637-650, Mar. 2002.

Wolniansky, P.W. et al., "V-BLAST: An Architecture for Realizing Very High Data Rates Over the Rich-Scattering Wireless Channel", in Proc. 1998 Int. Symp. Sig. Sys. Elect. (ISSSE'98), Pisa, Italy, Sep. 1998.

Foschini, G.J., "Layered Space-Time Architecture for Wireless communication in a Fading Environment When Using Multi-Element Antennas", Bell Labs, Technical Journal, 1(2): 41-59, 1996.

Golden, G.D. et al., "Detection Algorithm and Initial Laboratory Results Using V-BLAST Space-Time Communication Architecture", Elect. Let., 35:14-16, Jan. 1999.

Damen, O. et al., "Lattice Code Decoder for Space-Time Codes", IEEE Commun. Let., 4(5):161-163, May 2000.

Hochwald, B.M. et al., "Achieving Near-Capacity on a Multiple-Antenna Channel", IEEE Transactions on Communications, vol. 51, No. 3, Mar. 2003.

Chan, A.M. et al., "A New Reduced-Complexity Sphere Decoder for Multiple Antenna Systems", in Proc. 2002 Int. Commun. Conf. (ICC'02), New York, NY Apr. 2002.

Doucet, A. et al., "Sequential Monte Carlo Methods in Practice", New York: Springer-Verlag, 2001.

Wang, X. et al., "Monte Carlo Bayesian Signal Processing for Wireless Communications", J. VLSI Sig. Proc., 30 (1-3):89-105, Jan., Feb., Mar. 2002.

Chen, R. et al., "Adaptive Joint Detection and Decoding in Flat-Fading Channels via Mixture Kalman Filtering", IEEE Trans. Info. Theory, 46(6): 2079-2094, Sep. 2000.

Liu, J.S. et al., "Sequential Monte Carlo Methods for Dynamic Systems", J. Amer. Stat. Assoc., 93:1032-1044, 1998.

Chen, R. et al., "Mixture Kalman Filters", J. Amer. Stat. Assoc. (B), 62:493-509, 2000.

Yang, Z. et al., "A Sequential Monte Carlo Blind Receiver for OFDM Systems in Frequency-Selective Fading Channels", IEEE Trans. Sig. Proc., 50(2): 271-280, Feb. 2002.

Tonello, A.M., "On Turbo Equalization of Interleaved Space-Time Codes", in Proc. 2001 Fall Vehi. Tech. Conf. (VTC-Fall 2001), Oct. 2001.

Dai, H. et al., "Multiuser Detection for Interference-Limited MIMO Systems", in Proc. 2001 Spring Vehi. Tech. Conf. (VTC-Spring 2001), May 2001.

Sellathurai, M. et al., "TURBO-BLAST for Wireless Communications: Theory and Experiments", IEEE Trans. Sig. Proc., 50(10):2538-2546, Oct. 2002.

Wang, X. et al., "Iterative (Turbo) Soft Interference Cancellation and Decoding for Coded CDMA", IEEE. Trans. Commun., 47(7): 1046-1062, Jul. 1999.

Bahl, L.R. et al., "Optimal Decoding of Linear Codes for Minimizing Symbol Error Rate", IEEE. Trans. Info. Theory, 20(3): 284-287, Mar. 1974.

Marzetta, T.L., "BLAST Training: Estimating Channel Characteristics for High Capacity Space-Time Wireless", In Proc. 37th Annual Allerton Conf. Commun., Compu. & Control, Sep. 1999.

Sun, Q. et al., "Training-based Channel Estimation for Continuous Flat Fading BLAST", in Proc. 2002 Int. Conf. Commun. (ICC'02), New York, NY Apr. 2002.

Gordon, N.J. et al., "Novel Approach to Nonlinear/Non-Guassian Bayesian State Estimation", in 1993 IEEE Proc, F. Radar Sonar and Navigations, 140(2), Apr. 1993.

Kitagawa, G., "Monte Carlo Filter and Smoother for Non-Gaussian Nonlinear State Space Models", J. Comput. Graph. Statist., 5(1): 1-25, 1996.

Wang, X. et al., "Blind Turbo Equalization in Guassian and Impulsive Noise", IEEE Transactions on Vehicular Technology, vol. 50, No. 4, pp. 1092-1105, Jul. 2001.

Guo, D. et al., "Blind Detection in MIMO Systems via Sequential Monte Carlo", IEEE Journal on Selected Areas in Communications, vol. 21, No. 3, pp. 464-473, Apr. 2003.

Dong, B. et al., "A New Class of Soft MIMO Demodulation Algorithms", IEEE Transactions on Signal Processing, vol. 51, No. 11, pp. 2752-2763, Nov. 2003.

Doucet, A. et al., "On Sequential Monte Carlo Sampling Methods for Bayesian Filtering", Statistics and Computing (2000 Kluwer Academic Publishers) 10, pp. 197-208, accepted Aug. 1999.

* cited by examiner

REDUCED-COMPLEXITY MULTIPLE-INPUT MULTIPLE-OUTPUT (MIMO) CHANNEL DETECTION VIA SEQUENTIAL MONTE CARLO

CROSS-REFERENCE TO RELATED APPLICATIONS

This application is related to U.S. Non-Provisional Utility patent application Ser. No. 10/631,991, entitled "NEAR-OPTIMAL MULTIPLE-INPUT MULTIPLE-OUTPUT (MIMO) CHANNEL DETECTION VIA SEQUENTIAL MONTE CARLO," filed on Jul. 30, 2003, the contents of which are incorporated herein by reference.

BACKGROUND OF INVENTION

The invention relates generally to digital data receivers.

The ever-increasing demand for high-speed wireless data transmission has posed great challenges for wireless system designers to achieve high-throughput wireless communications in radio channels with limited bandwidth. Multiple transmit and receive antennas are likely to be the dominant solution in future broadband wireless communication systems, as it has been shown that the capacity of such a multiple-input multiple-output (MIMO) channel increases linearly with the minimum between the numbers of transmit and receive antennas in a rich-scattering environment, without a need for increasing the bandwidth or transmitted power. Because of the extremely high spectrum efficiency, MIMO techniques have been incorporated into several standards of various wireless applications, such as the IEEE 802.11a wireless LAN, the IEEE 802.16 wireless MAN, and the WCDMA standards.

A variety of MIMO receiver structures have been proposed in the art. A receiver structure utilizing maximum likelihood (ML) detection would be optimal, but has a complexity which grows exponentially in terms of the number of transmit antennas. Simpler detection schemes have been proposed based on nulling and interference cancellation (IC), such as the method of zero-forcing (ZF) nulling and IC with ordering, and minimum mean-squared error (MMSE) nulling and IC with ordering. See, e.g., P. W. Wolniansky et al., "V-BLAST: an Architecture for Realizing Very High Data Rates over the Rich-scattering Wireless Channel," In Procedings of Int. Symp. Sig. Sys. Elect. (ISSSE) (September 1998); G. J. Foschini, "Layed Space-Time Architecture for Wireless Communication in a Fading Environment When Using Multi-element Antennas," Bell Labs. Tech. J., 1(2), pp. 41-59 (1996); G. D. Golden et al., "Detection Algorithm and Initial Laboratory Results using V-BLAST Space-Time Communication Architecture," Elect. Let., 35, pp. 14-16 (January 1999). Unfortunately, the performance of these simple detection strategies is significantly inferior to that of ML detection. Sphere decoding has been proposed as a near-optimal detection method, whose complexity is cubic in terms of the number of transmit antennas. See O. Damen et al., "Lattice Code Design For Space-Time Codes," IEEE Commun. Let., 4(5), pp. 161-163 (May 2000). Detection schemes based on sphere decoding, however, are hard decision algorithms which suffer performance losses when concatenated with an outer channel decoder in coded MIMO systems. A detection scheme has been proposed that modifies sphere decoding to yield soft decision output—but at the expense of a significantly higher complexity.

In co-pending commonly-assigned U.S. Non-Provisional Utility patent application Ser. No. 10/631,991, entitled "NEAR-OPTIMAL MULTIPLE-INPUT MULTIPLE-OUTPUT (MIMO) CHANNEL DETECTION VIA SEQUENTIAL MONTE CARLO," filed on Jul. 30, 2003, the contents of which are incorporated herein by reference, it has been shown that sequential Monte Carlo methods could be employed for demodulation in MIMO systems, achieving near optimal performance while maintaining low computational complexity. The detection approach disclosed therein, however, does become more computationally complex as the size of the modulation symbol constellation grows. Accordingly, it would be advantageous to improve the approach and achieve the same performance while further reducing the number of computations required.

SUMMARY OF INVENTION

A detection system and method are disclosed for a multiple-input multiple-output (MIMO) system that advantageously utilizes a sequential Monte Carlo technique in a manner that further reduces computational complexity. The detector generates Monte Carlo samples of the transmitted symbols weighted with respect to a probability distribution of the transmitted symbols given the signals received at the detector. In accordance with an aspect of the invention, however, each symbol is decomposed into a first symbol component and a second symbol component (e.g., into a real and an imaginary symbol component) which are each sampled independently, thereby reducing the number of possible symbol candidates given the modulation scheme used. The detector takes advantage of the fact that the separate symbol components of the observation at the kth antenna become independent of the components of the symbol at the kth antenna respectively when an orthogonal symbol constellation is used for modulation.

The detector can take advantage of the sequential structure of a simple nulling and cancellation scheme by operating on a spatial domain of the transmit antennas—and can extend the sequentiality to the separate symbol components of the transmitted symbols. The weighted samples for the first and second symbol components of the symbols can be generated by the detector using a stochastic approach or a deterministic approach. In the stochastic approach, the samples for the first and second symbol components of the symbols are drawn from a trial distrubution obtained from the sequential structure of the detection scheme, and the importance weights are updated based on the results. In the deterministic approach, an initial estimate of the probability distribution is computed by enumerating first and second symbol component samples for less than all transmit antennas. The candidate trajectories in this probability distribution are then pared down to a set with the highest importance weights.

The detector design is particularly advantageous when used as a soft-input soft-output demodulator in a turbo receiver. The disclosed detector is able to provide symbol detection with a complexity that is proportional to the square root of the constellation size, in contrast to prior art schemes which have a complexity that is linearly proportional to constellation size. These and other advantages of the invention will be apparent to those of ordinary skill in the art by reference to the following detailed description and the accompanying drawings.

DETAILED DESCRIPTION

Figure 1:
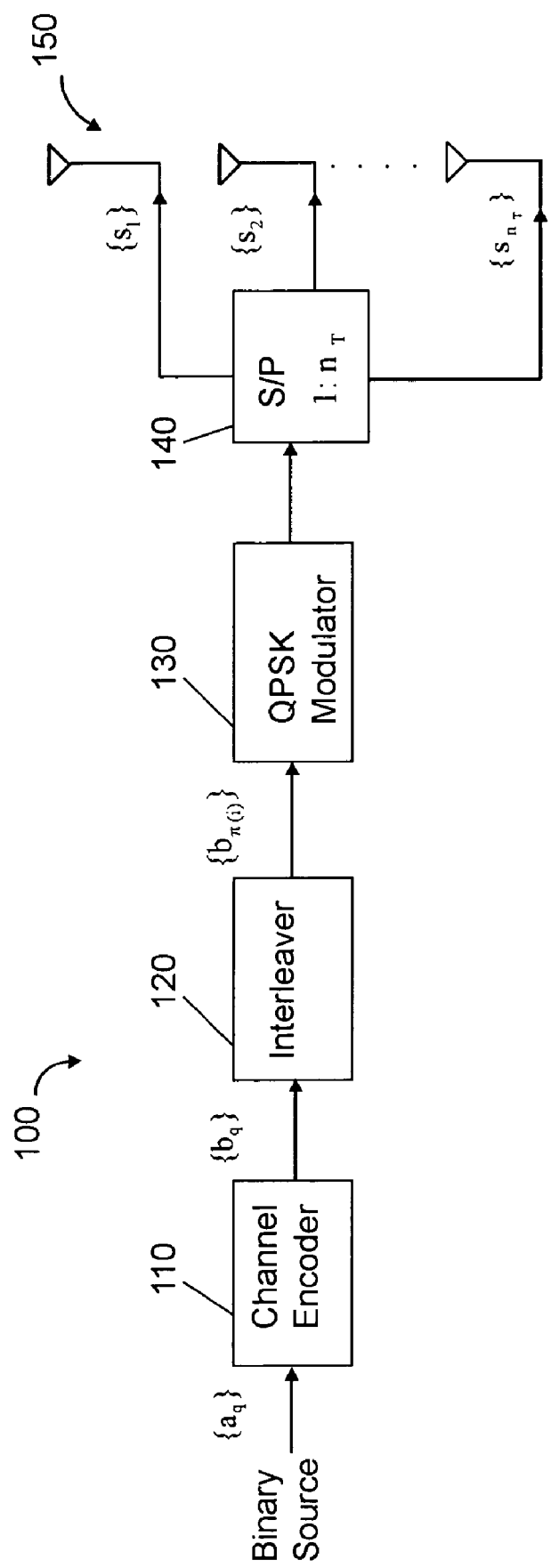
FIG. 1 illustrates a transmitter structure of a coded multiple-input multiple-output (MIMO) system, suitable for practice of an embodiment of the invention.
Figure 2:
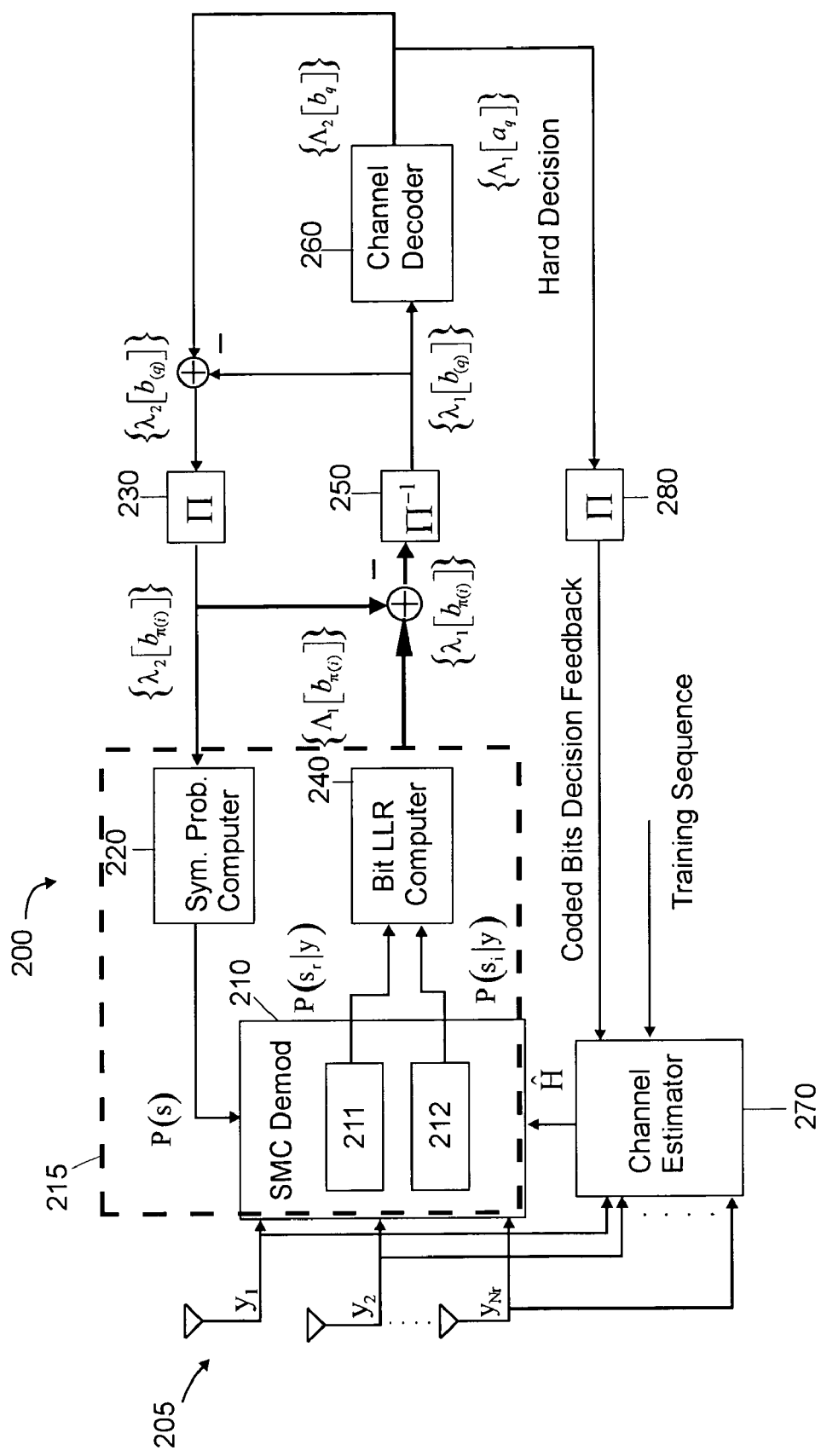
FIG. 2 illustrates a receiver structure of a coded MIMO system, suitable for practice of an embodiment of the invention.

FIG. 1 and FIG. 2 illustrate a generic multiple-input multiple-output (MIMO) system suitable for practice of an embodiment of the present invention. FIG. 1 shows an example transmitter structure 100 and FIG. 2 shows an example receiver structure 200.

It is assumed, without limitation, that the MIMO system has $n_T$ transmit and $n_R$ receive antennas with $n_R \geq n_T$. The wireless channel, without limitation, is assumed to have rich-scattering and flat fading. The fading between each transmit and receive antenna pair is assumed to be independent. The channel is also assumed, without limitation, to be quasi-static, i.e., it is static over a data burst and changes from burst to burst.

At the transmitter 100, blocks of information bits $\{a_l\}$ are encoded into code bits $\{b_i\}$ at a channel encoder 110. The code bits can be randomly interleaved at an interleaver 120 and mapped to values from a finite alphabet set $A = \{a_1, a_2, \ldots, a_M\}$, for example, to an M-PSK or M-QAM modulation symbol stream using a QPSK modulator 130. Each symbol can be serial-to-parallel converted at a converter 140 to $n_T$ sub-streams via demultiplexing and each sub-stream can be associated with one of a number $n_T$ of transmit antennas 150. At each time instance, one symbol from each sub-stream is transmitted from its corresponding antenna, resulting in $n_T$ symbols transmitted simultaneously in the same channel. Such a space-time bit interleaved coded modulation (BICM) allows for a better exploitation of the spatial, temporal and frequency diversity resources available in the wireless MIMO system. The whole MIMO system can be treated as a serial concatenated system, since the combination of the M-PSK or M-QAM modulation and the symbol-antenna mapping effectively act as an inner encoder in the transmitter. Thus, an iterative (turbo) receiver can be designed for the system.

FIG. 2 shows the receiver 200 arranged as a turbo receiver with two stages: a soft-input soft-output SMC demodulator 210 followed by a soft channel decoder 260. The two stages are separated by a deinterleaver 250 and an interleaver 230, assuming an interleaver is utilized in the transmitter 100. The SMC demodulator 210 receives as input the received signals, channel state information from channel estimator 270, and a priori symbol information as computed from extrinsic information. The extrinsic information from the channel decoder 260 in a previous iteration can be interlaced and delivered to the demodulator 210 as a priori symbol information, while the extrinsic information from the demodulator 210 can be deinterlaced and fed back to the channel decoder 260 as the a priori information for the channel decoder 260. Each block of information bits can be decoded using its probability as generated iteratively between the demodulator 210 and the decoder 260.

The signals received by the receiver 200 and processed by the demodulator 210 can be modeled as follows. After matched filtering and symbol rate sampling, the received signal vector from $n_R$ receive antennas at a receiver can be denoted as $$y(i) = [y_1(i) \cdots y_{n_R}(i)]^T.$$

In complex baseband representation, the received signal can be expressed as the linear combination of the transmitted signal $s(i) = [s_1(i), \ldots, s_{n_T}(i)]^T$ $$y(i) = \sqrt{\frac{\rho}{n_T}} Hs(i) + v(i), i = 1 \cdots N, \qquad (1)$$

where $s(i) \in A^{n_T}$, $\rho$ is the total signal energy at the transmitter, $H \in \mathbb{C}^{n_R \times n_T}$ is the complex fading channel matrix, and $v(i) \sim \mathcal{N}_c(0, I_{n_R})$ is the spatially and temporally white Gaussian noise, and N is the data burst length. Denote $\Omega \triangleq H^H H$. The received signal can be matched-filtered and whitened, to obtain (here for simplicity, the time index i is dropped)

$$u \triangleq \Omega^{-\frac{1}{2}} H^H y \qquad (2)$$

$$= \sqrt{\frac{\rho}{n_T}} \Omega^{\frac{1}{2}} s + w,$$

where $w \triangleq \Omega^{-1/2} H^H v \sim \mathcal{N}_c(0, I_{n_T})$.

It is assumed, without limitation, that the symbols are decomposable into a first and second symbol component, illustratively herein described as the real and imaginary components of the symbols. One of ordinary skill in the art would readily recognize that any alternative scheme for decomposing a symbol into components could also be used. The demodulator 210 initially assumes that all the symbols are equally likely, which in turn means that the real and imaginary components of the symbol are equally probable. Therefore the a priori probability for the symbol components is given by $$P(s_{r,k} = a_{r,q}) = P(s_{i,k} = a_{i,q}) = \frac{1}{\sqrt{A}}.$$

The demodulator 210 outputs the a posteriori probabilities of the real and imaginary components of the symbol $P(s_{r,k}=a_{r,q}|u)$, and $P(s_{i,k}=a_{i,q}|u)$, $k=1,2,\ldots,n_T, j=1,2,\ldots,M$. Denote $$S_{r,k}^{(j)} \triangleq \{(s_1, \ldots, s_{k-1}, a_{r,q}, s_{i,k}, s_{k+1}, \ldots, s_{n_T}) : s_l \in A, l \neq k\}.$$

The exact expression of $P(s_{r,k}=a_{r,q}|u)$ is given by $$P(s_{r,k} = a_{r,q} \mid u) = \frac{p(u \mid s_{r,k} = a_{r,q})P(s_{r,k} = a_{r,q})}{p(u)} \qquad (3)$$

$$\propto P(s_{r,k} = a_{r,q})$$

$$\sum_{s \in S_k^{(j)}} \exp\left(-\left\|u - \sqrt{\frac{\rho}{n_T}} \Omega^{\frac{1}{2}} s\right\|^2\right) \prod_{l \neq k} P(s_l).$$

A similar expression gives the a posteriori probability of the imaginary component of the symbol. Based on the a posteriori probabilities of the symbol component computed by the demodulator 210, a bit LLR computer 240 can be used to calculate the a posteriori log-likelihood ratios (LLRs) of the interleaved code bits $b_{\pi(i)}$. In an M-QAM modulation scheme, $B=\log_2 M$ bits are mapped to one symbol. Let a first $\frac{B}{2}$ portion of bits represent the real part of the symbol and a second $\frac{B}{2}$ portion of bits represent the imaginary part of the symbol. Assuming that the code bit $b_{\pi(i)}$ is included in a real part of the M-QAM symbol $s_k \in A'$, the LLR of this code bit is given by $$\Lambda_1[b_{\pi(i)}] \triangleq \log \frac{P(b_{\pi(i)} = 1 \mid u)}{P(b_{\pi(i)} = 0 \mid u)} \quad (4)$$

$$= \log \frac{\sum_{a_q \in A: s_{r,k} = a_{r,q}, b_{\pi(i)}=1} P(s_{r,k} = a_{r,q} \mid u)}{\sum_{a_q \in A: s_{r,k} = a_{r,q}, b_{\pi(i)}=0} P(s_{r,k} = a_{r,q} \mid u)},$$

$$k = 1, \ldots, n_T.$$

The a posteriori LLR of the code bits corresponding to the imaginary component of the symbols can be calculated in a similar manner. Since the summations in the above equations for the a posteriori probabilities are over all the $A'^{n_T-1}$ possible vectors s in $S_k^{(j)}$, $j=1, \ldots, M$, its complexity is disadvantageously exponential in the number of transmit antennas and impractical for systems with high spatial-multiplexing gain.

In accordance with an embodiment of an aspect of the invention, and as depicted in FIG. 2, the demodulator 210 utilizes sequential Monte Carlo (SMC) approximation to estimate the a posteriori probability for the real components of the symbol at 211 separately from the a posteriori probability for the imaginary components of the symbol at 212. As discussed in further detail below, the disclosed detection scheme advantageously has a complexity that is proportional to the square root of the constellation size.

An optimal maximum likelihood (ML) MIMO detector can be expressed for the received signal as:

$$\hat{s} = \arg \min_{s \in A^{n_T}} \left\| u - \sqrt{\frac{\rho}{n_T}} \Omega^{\frac{1}{2}} s \right\|^2. \quad (5)$$

As discussed in the background, the complexity of the ML receiver disadvantageously grows exponentially in the number of transmit antennas. A sub-optimal detector based on the technique of nulling and cancellation can be expressed as follows. Denote the QR-decomposition of $\Omega^{1/2}$ as $$\Omega^{1/2} = Q R, \quad (6)$$

where $Q$ is a unitary matrix and $R$ is an upper triangular matrix. The nulling operation is a coordinate rotation that left-multiplies the vector u in equation (2) by $Q^H$ to produce a sufficient statistic, $$z = Q^H u \quad (7)$$

$$= \sqrt{\frac{\rho}{n_T}} R s + \tilde{v},$$

where $\tilde{v} = Q^H v$. Since $Q$ is unitary, there is no noise enhancement and the noise whitening characteristic maintains by nulling, i.e., $\tilde{v} \sim \mathcal{N}_c(0, I_{n_T})$. The above equation can be rewriten as $$\underbrace{\begin{bmatrix} z_1 \\ z_2 \\ \vdots \\ z_{n_T} \end{bmatrix}}_{z} = \sqrt{\frac{\rho}{n_T}} \underbrace{\begin{bmatrix} r_{1,1} & r_{1,2} & \cdots & r_{1,n_T} \\ & r_{2,2} & \cdots & r_{2,n_T} \\ & & \ddots & \vdots \\ & & & r_{n_T,n_T} \end{bmatrix}}_{R} \underbrace{\begin{bmatrix} s_1 \\ s_2 \\ \vdots \\ s_{n_T} \end{bmatrix}}_{s} + \underbrace{\begin{bmatrix} \tilde{v}_1 \\ \tilde{v}_2 \\ \vdots \\ \tilde{v}_{n_T} \end{bmatrix}}_{\tilde{v}} \quad (8)$$

The data signals can be detected directly by nulling operation, i.e., multiply z by $R^{-1}$. It has been shown, however, that by utilizing the upper triangular structure of $R$, significant improvement over zero-forcing can be obtained with the following successive interference cancellation method:

$$\hat{s}_{n_T} = L\left(\sqrt{\frac{n_T}{\rho}} \frac{z_{n_T}}{r_{n_T,n_T}}\right), \quad (9)$$

$$\hat{s}_{n_T-1} = L\left(\frac{1}{r_{n_T-1,n_T-1}}\left(\sqrt{\frac{n_T}{\rho}} z_{n_T-1} - r_{n_T-1,n_T}\hat{s}_{n_T}\right)\right),$$

$$\vdots$$

$$\hat{s}_1 = L\left(\frac{1}{r_{1,1}}\left(\sqrt{\frac{n_T}{\rho}} z_1 - \sum_{k=2}^{n_T} r_{1,k}\hat{s}_k\right)\right),$$

where $L(x) = \arg \min_{s_i \in A'}(|x - s_i|)$. See G. J. Foschini, "Layered Space-Time Architecture for Wireless Communication in a Fading Environment When Using Multi-Element Antennas," Bell Labs Tech. J., 1(2), pp. 41-59 (1996). Although the above simple nulling and cancellation scheme has a very low complexity, its performance is much worse than that of the methods based on zero-forcing or MMSE nulling and interference cancellation with ordering as well as that of sphere decoding.

As discussed in greater length in co-pending commonly-assigned U.S. Non-Provisional Utility patent application Ser. No. 10/631,991, entitled "NEAR-OPTIMAL MULTIPLE-INPUT MULTIPLE-OUTPUT (MIMO) CHANNEL DETECTION VIA SEQUENTIAL MONTE CARLO," filed on Jul. 30, 2003, the contents of which are incorporated herein by reference, the artificial sequential structure of this simple nulling and interference cancellation scheme due to the upper-triangular structure is well suited for applying SMC to MIMO data detection with the particularity of operating on spatial domain starting from antenna $n_T$ to antenna 1. Indeed one has $$P(s \mid u) = P(s \mid z) \propto \prod_{k=1}^{n_T} p(z_k \mid \tilde{S}_k) P(s_k), \quad (10)$$

where $\tilde{Z}_k = (z_k, \ldots, z_{n_T})$ and $\tilde{S}_k = (s_k, \ldots, s_{n_T})$. In contrast with the SMC approach disclosed therein, however, it is herein observed that if an orthogonal symbol constellation is used for modulation, the real and imaginary components of the observation at the kth antenna become independent of the imaginary and real components of the symbol at kth antenna respectively. A direct consequence of which is that the real and imaginary components of the symbol at the kth antenna can be sampled independently, thereby reducing the number of possible candidates from M to $\sqrt{M}$ for an M-QAM modulation scheme. The sequentiality in the above equation can be extended to the real and imaginary components, and SMC used to simulate from the sequence of probability distributions $$\{p(\tilde{S}_k \mid \tilde{Z}_k)\}_{k=n_T, n_T-1, \ldots, 1}.$$

This sequence of "artificial" distributions is defined by $$P((\tilde{S})_k \mid (\tilde{Z})_k) \propto \qquad (11)$$

$$\prod_{l=k}^{n_T} p(z_{r,l} \mid s_{r,l}, s_{i,l}\tilde{S}_{l+1}, z_{i,l}, \tilde{Z}_{l+1}) P(s_{r,l}) p(z_{i,l} \mid s_{i,l}\tilde{S}_{l+1}, \tilde{Z}_{l+1}) P(s_{i,l}) \propto$$

$$\prod_{l=k}^{n_T} p(z_{r,l} \mid s_{r,l}\tilde{S}_{l+1}) P(s_{r,l}) p(z_{i,l} \mid s_{i,l}\tilde{S}_{l+1}) P(s_{i,l})$$

where the subscript r and i represent the real and imaginary parts of the corresponding entity respectively. The aim of the detection scheme is to compute an estimate of the a posteriori probability of symbol components $$P(s_{r,k} = a_{r,q} \mid z_{r,k}, \tilde{Z}_{k+1}), \qquad (12)$$

and $$P(s_{i,k} = a_{i,q} \mid z_{i,k}, \tilde{Z}_{k+1}), a_q \in \mathcal{A}, k=1, \ldots, n_T,$$

based on the received signal z after nulling Let $$\tilde{S}_k^{(j)} \triangleq (s_{r,k}^{(j)}, s_{i,k}^{(j)}, \ldots, s_{r,n_T}^{(j)}, s_{i,n_T}^{(j)}), j=1, \cdots, m,$$

be a sample drawn by the SMC at each symbol interval, where m is the number of samples. In accordance with the SMC technique, one needs to obtain a set of Monte Carlo samples of the transmitted symbols $\{(s_{r,k}^{(j)}, w_{r,k}^{(j)}), (s_{i,k}^{(j)}, w_{i,k}^{(j)})\}$ properly weighted with respect to the distribution of p(s|z). The a posteriori probability of the real part of information symbol $s_{r,k}$ can then be estimated as $$P(s_{r,k} = a_{r,q} \mid z) = E\{\mathbb{I}(s_{r,k} = a_{r,q}) \mid z\} \qquad (13)$$

$$\cong \frac{1}{W_k} \sum_{j=1}^m \mathbb{I}(s_{r,k}^{(j)} = a_{r,q}) w_k^{(j)}, a_q \in \mathcal{A},$$

and $$P(s_{i,k} = a_{i,q} \mid z) = E\{\mathbb{I}(s_{i,k} = a_{i,q}) \mid z\} \qquad (14)$$

$$\cong \frac{1}{W_k} \sum_{j=1}^m \mathbb{I}(s_{i,k}^{(j)} = a_{i,q}) w_k^{(j)}, a_q \in \mathcal{A},$$

where $W_k \triangleq \sum_{j=1}^m w_k^{(j)}.$ and $\mathbb{I}(\cdot)$ is the indicator function defined as $$\mathbb{I}(x=a) = \begin{cases} 1, & \text{if } x = a, \\ 0, & \text{if } x \neq a. \end{cases} \qquad (15)$$

Figure 3:
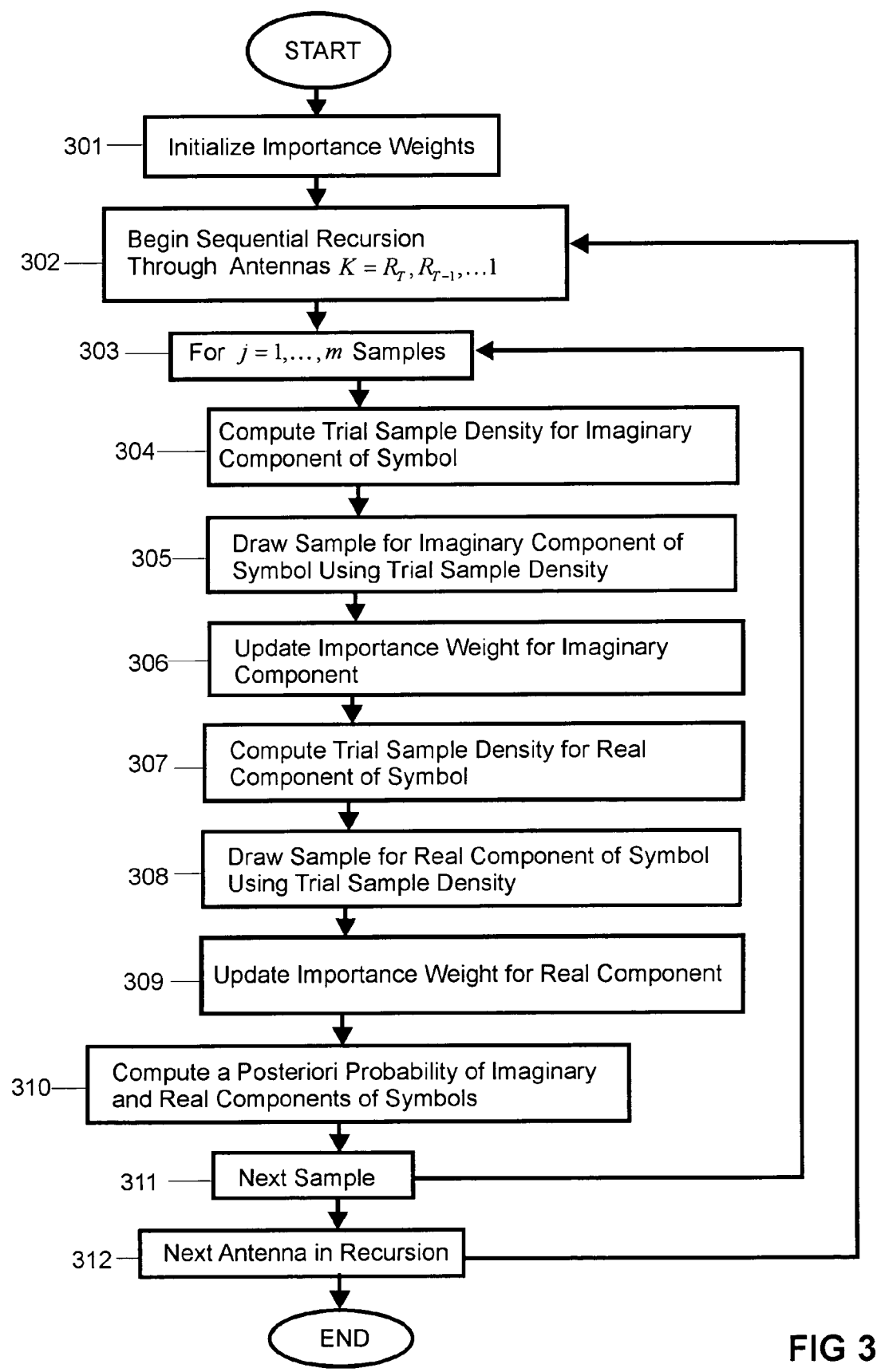
FIG. 3 is a flowchart of MIMO demodulation processing performed in accordance with a stochastic SMC embodiment of the invention.

FIG. 3 is a flowchart of processing performed by the SMC demodulator, in accordance with an embodiment that utilizes stochastic SMC.

At step 301, the importance weights are initialized as $w_{-1}^{(j)}=1$, $j=1, \ldots, m$. At step 302, the k-th recursion is commenced, where ($k=n_T, n_T-1, \ldots, 1$). During each recursion, each of the weighted samples is updated at steps 303-311, for $j=1, \ldots, m$. At step 304, the trial sampling density for the imaginary component $\alpha_{i,k,j}^{(j)}$ is computed for each ai, $q=\mathcal{IM}(a_q) \in \mathcal{A}'$. The trial distribution for the imaginary component can be chosen as:

$$q(s_{i,k} \mid z_{i,k}, \tilde{Z}_{k+1}, \tilde{S}_{k+1}^{(j)}) \propto \qquad (16)$$

$$P(s_{i,k} \mid z_{i,k}, \tilde{Z}_{k+1}, \tilde{S}_{k+1}^{(j)}) \propto p(z_{i,k} \mid s_{i,k}, \tilde{Z}_{k+1}, \tilde{S}_{k+1}^{(j)}) \cdot P(s_{i,k})$$

Since the noise $\tilde{v}$ in equation (7) is white Gaussian i.e., $\tilde{v} \sim \mathcal{N}_c(0, \Pi_{n_T})$, $$p(z_{i,k} \mid s_{i,k} = ai, q, \tilde{Z}_{k+1}, \tilde{S}_{k+1}^{(j)}) \cdot P(s_{i,k} = a_{i,q}) \sim \mathcal{N}_c\left(\mu_{i,k,q}^{(j)}, \frac{1}{2}\right), \qquad (17)$$

where the mean $\mu_{i,k,q}^{(j)}$ is given by $$\mu_{i,k,q}^{(j)} = \mathcal{IM}\left(\sqrt{\frac{\rho}{n_T}} \sum_{l=k+1}^{n_T} r_{k,l} s_l^{(j)} + \sqrt{\frac{\rho}{n_T}} r_{k,k} a_q\right). \qquad (18)$$

Denote $$\alpha_{i,k,q}^{(j)} \triangleq p(z_{i,k} \mid \tilde{Z}_{k+1}, \tilde{S}_{k+1}^{(j)}, s_{i,k} = a_{i,q}) \cdot P(s_{i,k} = a_{i,q}) \qquad (19)$$

$$= \frac{1}{\pi} \exp\{-\|z_{i,k} - \mu_{i,k,q}^{(j)}\|^2\} \cdot P(s_{i,k} = a_{i,q}). \qquad (20)$$

At step 305, a sample $s_{i,k}^{(j)}$ is drawn from the set $\mathcal{IM}(a_q) \in \mathcal{A}'$ with probability $$P(s_{i,k} = a_{i,q} \mid \tilde{S}_{k+1}^{(j)}, z_{i,k}, \tilde{Z}_{k+1}) \propto \alpha_{i,k,q}^{(j)}, a_{i,q} = \mathcal{IM}(a_q) \in \mathcal{A}. \qquad (21)$$

At step 306, the importance weight for the imaginary component is computed. For the above trial distribution, the importance weight can be updated according to $$w_{i,k}^{(j)} = w_{k+1}^{(j)} \cdot \frac{P(s_{i,k}, \tilde{S}_{k+1}^{(j)} \mid z_{i,k}, \tilde{Z}_{k+1})}{P(\tilde{S}_{k+1}^{(j)} \mid \tilde{Z}_{k+1}) P(s_{i,k}^{(j)} \mid z_{i,k}, \tilde{Z}_{k+1}, \tilde{S}_{k+1}^{(j)})} \qquad (22)$$

$$= w_{k+1}^{(j)} \cdot \frac{P(\tilde{S}_{k+1}^{(j)} \mid z_{i,k}, \tilde{Z}_{k+1})}{P(\tilde{S}_{k+1}^{(j)} \mid \tilde{Z}_{k+1})}$$

$$\propto w_{k+1}^{(j)} \cdot p(z_{i,k} \mid \tilde{Z}_{k+1}, \tilde{S}_{k+1}^{(j)})$$

$$= w_{k+1}^{(j)} \cdot \sum_{a_q \in \mathcal{A}} p(z_{i,k} \mid \tilde{Z}_{k+1}, \tilde{S}_{k+1}^{(j)}, s_{i,k} = a_{i,q}) P(s_{i,k} = a_{i,q})$$

$$= w_{k+1}^{(j)} \cdot \sum_{a_q \in \mathcal{A}} \alpha_{i,k,q}^{(j)}.$$

At step 307, the trial sampling density for the real component $\alpha_{r,k,q}^{(j)}$ is computed for each ar, $q=\mathcal{RE}(a_q) \in \mathcal{A}'$. For the real component, the trial distribution can be chosen as:

$$q(s_{r,k} \mid z_{r,k}, z_{i,k} \tilde{Z}_{k+1}, s_{i,k}, \tilde{S}_{k+1}^{(j)}) \propto P(s_{r,k} \mid z_{r,k}, zi, k, \quad (23)$$

$$\tilde{Z}_{k+1}, s_{i,k}, \tilde{S}_{k+1}^{(j)})$$

$$\propto p(z_{r,k} \mid s_{r,k}, \tilde{Z}_{k+1}, \tilde{S}_{k+1}^{(j)}) \cdot$$

$$P(s_{r,k})$$

The first term in equation (23) is Gaussian~$\mathcal{N}_c(\mu_{r,k,q}^{(j)}, \frac{1}{2})$, with mean $\mu_{r,k,q}^{(j)}$ given by $$\mu_{r,k,q}^{(j)} = \mathcal{RE}\left(\sqrt{\frac{\rho}{n_T}} \sum_{l=k+1}^{n_T} r_{k,l} s_l^{(j)} + \sqrt{\frac{\rho}{n_T}} r_{k,k} a_q\right). \quad (24)$$

Denote $$\alpha_{r,k,q}^{(j)} \triangleq p(z_{r,k} \mid \tilde{Z}_{k+1}, \tilde{S}_{k+1}^{(j)}, s_{r,k} = a_{r,q}) \cdot P(s_{r,k} = a_{r,q}) \quad (25)$$

$$= \frac{1}{\pi} \exp\{-\|z_{r,k} - \mu_{r,k,q}^{(j)}\|^2\} \cdot P(s_{r,k} = a_{r,q}). \quad (26)$$

At step 308, a sample $s_{r,k}^{(j)}$ is drawn from the set $I\mathcal{M}(a_q) \in \mathcal{A}'$ with probability $$P(s_{r,k} = a_{r,q} \mid \tilde{S}_{k+1}^{(j)}, z_{r,k}, \tilde{Z}_{k+1}) \propto \alpha_{r,k,q}^{(j)}, a_{r,q} = \mathcal{RE}(a_j) \in \mathcal{A}. \quad (27)$$

At step 309, the importance weight for the real component is computed. For the above trial distribution, the importance weight for the real component can be updated according to $$w_k^{(j)} = w_{i,k}^{(j)} \cdot \frac{P(s_{r,k}, s_{i,k}^{(j)}, \tilde{S}_{k+1}^{(j)} \mid z_{r,k}, z_{i,k}, \tilde{Z}_{k+1})}{P(s_{i,k}^{(j)}, \tilde{S}_{k+1}^{(j)} \mid z_{i,k}, \tilde{Z}_{k+1})} \quad (28)$$

$$P(s_{r,k}^{(j)} \mid z_{r,k}, z_{i,k}, \tilde{Z}_{k+1}, s_{i,k}^{(j)}, \tilde{S}_{k+1}^{(j)})$$

$$= w_{i,k}^{(j)} \cdot \frac{P(s_{i,k}^{(j)}, \tilde{S}_{k+1}^{(j)} \mid z_{r,k}, z_{i,k}, \tilde{Z}_{k+1})}{P(s_{i,k}^{(j)}, \tilde{S}_{k+1}^{(j)} \mid z_{i,k}, \tilde{Z}_{k+1})}$$

$$\propto w_{i,k}^{(j)} \cdot p(z_{r,k} \mid z_{i,k}, \tilde{Z}_{k+1}, s_{i,k}^{(j)}, \tilde{S}_{k+1}^{(j)})$$

$$= w_{i,k}^{(j)} \cdot \sum_{a_q \in \mathcal{A}} p(z_{r,k} \mid \tilde{Z}_{k+1}, \tilde{S}_{k+1}^{(j)}, s_{r,k} = a_{r,q}) P(s_{r,k} = a_{r,q})$$

$$= w_{i,k}^{(j)} \cdot \sum_{a_q \in \mathcal{A}} \alpha_{r,k,q}^{(j)}.$$

At step 310, the a posteriori probability of the information symbol $s_k$ can be computed, according to equations (14) and (13).

Although not depicted in FIG. 3, resampling can be performed, for example, if the effective sample size becomes less than a threshold. Details regarding resampling and other issues such as channel parameter estimation are further dis-closed in co-pending commonly-assigned U.S. Non-Provisional Utility patent application Ser. No. 10/631,991, entitled "NEAR-OPTIMAL MULTIPLE-INPUT MULTIPLE-OUTPUT (MIMO) CHANNEL DETECTION VIA SEQUENTIAL MONTE CARLO," filed on Jul. 30, 2003, the contents of which are incorporated herein by reference.

Figure 4:
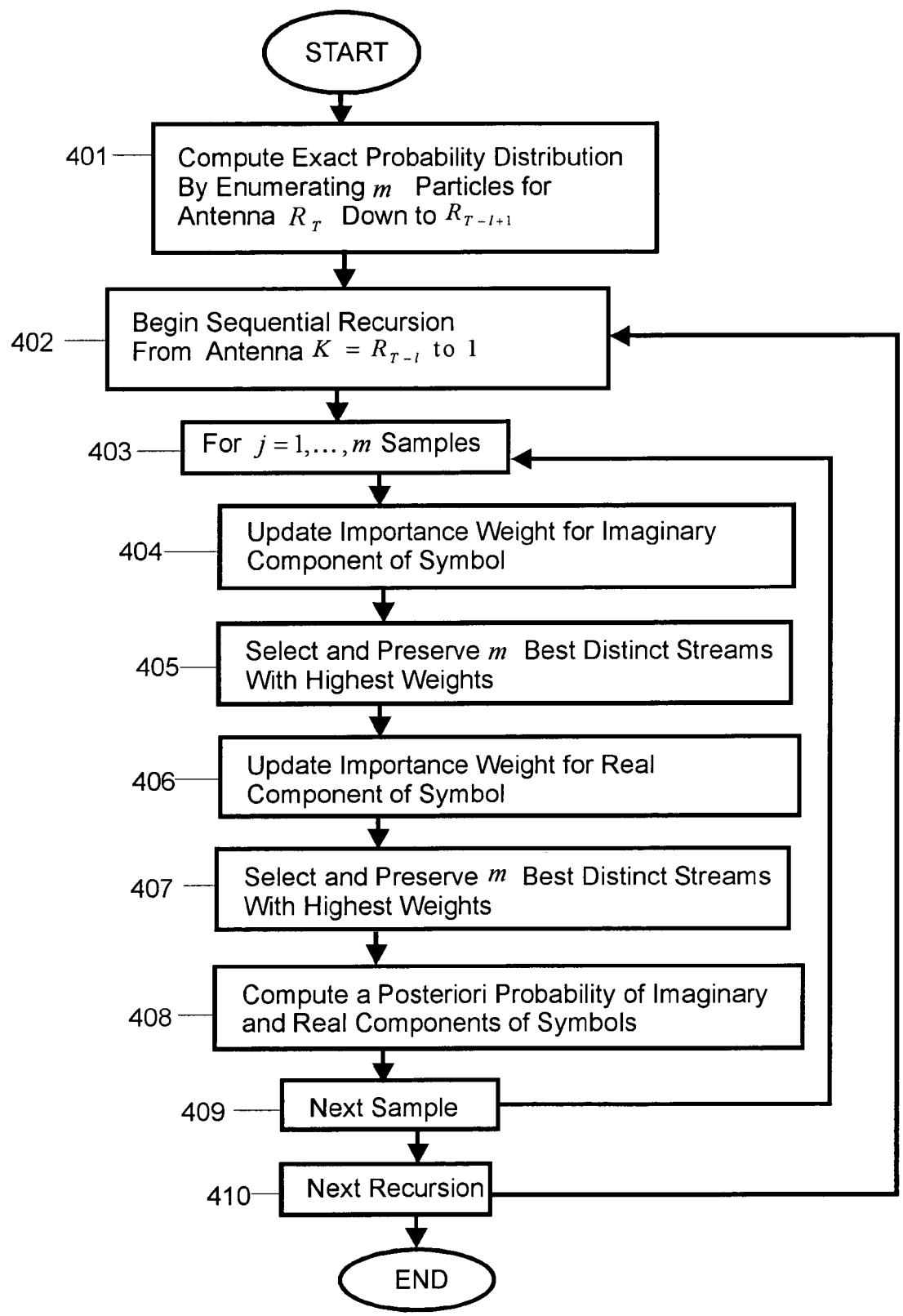
FIG. 4 is a flowchart of MIMO demodulation processing performed in accordance with a deterministic SMC embodiment of the invention.

FIG. 4 is a flowchart of processing performed by the SMC demodulator, in accordance with an embodiment that utilizes deterministic SMC.

The deterministic approach to estimating the sequence of probability distributions $$\{P(s_{i,k}, \tilde{S}_{k+1} \mid z_{i,k}, \tilde{Z}_{k+1})\}$$

for the imaginary components and $$\{P(s_{r,k}, s_{i,k}, \tilde{S}_{k+1} \mid zr, k, z_{i,k}, \tilde{Z}_{k+1})\}_{k=n_T, n_T-1, \ldots, 1}$$

for the real components of the symbols proceeds as follows. It is assumed that m samples are drawn at each iteration. At step 401, the exact probability distribution $$P(s_{i,n_T-l+1}, s_{r,n_T-l+1}, \ldots, s_{i,n_T}, s_{r,n_T} \mid \tilde{Z}_{n_T-l+1})$$

is computed by enumerating all m particles for antenna $n_T$ down to antenna $n_T-l+1$. As a result, a set of m distinct symbol sequences $\{s_{r,n_T-l+1}^{(j)}, s_{i,n_T-l+1}^{(j)}, \ldots, s_{r,n_T}^{(j)}, s_{i,n_T}^{(j)}\}_{j=1}^m$ is generated with the sequence of weights $\{w_{i,n_T-l+1}^{(j)}\}_{j=1}^m$, obtained after listing the imaginary part of the symbol at the $(n_T-l+1)^{th}$ antenna, and $\{w_{n_T-l+1}^{(j)}\}_{j=1}^m$ obtained after listing the real part of the symbol at antenna $n_T-l+1$, satisfying $$w_{i,n_T-l+1}^{(j)} = P(s_{i,n_T-l+1}^{(j)}, \tilde{S}_{n_T-l+2}^{(j)} \mid z_{i,n_T-l+1}, \tilde{Z}_{n_T-l+2}) \quad (29)$$

$$\propto p(z_{i,k} \mid s_{i,n_T-l+1}^{(j)} = a_{i,q}, \tilde{S}_{n_T-l+2}^{(j)}) \cdot$$

$$P(s_{i,n_T-l+1}^{(j)} = a_{i,q}) \cdot P(\tilde{S}_{n_T-l+2} \mid \tilde{Z}_{n_T-l+2})$$

$$= \beta_{i,n_T-l+1,q}^{(j)} \prod_{k=n_T-l+2}^{n_T} \beta_{i,k,q}^{(j)} \cdot \beta_{r,k,q}^{(j)},$$

where $$\beta_{i,k,q}^{(j)} \triangleq p(z_{i,k} \mid \tilde{S}_{k+1}^{(j)}, s_{i,k}^{(j)} = a_{i,q}) \cdot P(s_{i,k}^{(j)} = a_{i,q}) \quad (30)$$

$$= \frac{1}{\pi} \exp\{-\|z_{i,k} - \mu_{i,k,q}^{(j)}\|^2\} \cdot P(s_{i,k}^{(j)} = a_{i,q}), \quad (31)$$

and $\mu_{i,k,q}^{(j)}$ is given by equation (18)

$$\beta_{r,k,q}^{(j)} \triangleq p(z_{r,k} \mid \tilde{S}_{k+1}^{(j)}, s_{r,k}^{(j)} = a_{r,q}) \cdot P(s_{r,k}^{(j)} = a_{r,q}) \quad (32)$$

$$= \frac{1}{\pi} \exp\{-\|z_{r,k} - \mu_{r,k,q}^{(j)}\|^2\} \cdot P(s_{r,k}^{(j)} = a_{r,q}), \quad (33)$$

and $\mu_{r,k,q}^{(j)}$ is given by equation (24)

$$w_{n_T-l+1}^{(j)} = P\left(s_{r,n_T-l+1}^{(j)}, s_{i,n_T-l+1}^{(j)}, \tilde{S}_{n_T-l+2}^{(j)} \mid z_{r,n_T-l+1}, z_{i,n_T-l+1}, \tilde{Z}_{n_T-l+2}\right) \quad (34)$$

$$\propto p\left(z_{r,k} \mid s_{r,n_T-l+1}^{(j)} = a_{r,q}, s_{i,n_T-l+1}^{(j)}, \tilde{S}_{n_T-l+2}^{(j)}\right) \cdot$$

$$P\left(s_{r,n_T-l+1}^{(j)} = a_{r,q}\right) \cdot$$

$$P\left(s_{i,n_T-l+1}, \tilde{S}_{n_T-l+2} \mid z_{i,n_T-l+1}, \tilde{Z}_{n_T-l+2}\right)$$

$$= \beta_{r,n_T-l+1,q}^{(j)} \cdot w_{i,n_T-l+1}^{(j)}.$$

At step 402, the following steps are performed from antenna $n_T$–l to antenna 1 (i.e., k=$n_T$–l, . . . , 1). For j=1, . . . , m, each importance weight sample is updated according to $$w_{i,k}^{(j)}(a_{i,q}) \propto w_{k+1}^{(j)} \cdot p\left(z_{i,k} \mid \tilde{S}_{k+1}^{(j)}, s_{i,k}^{(j)} = a_{i,q}\right) P\left(s_{i,k}^{(j)} = a_{i,q}\right), \quad (35)$$

$$a_q \in \mathcal{A},$$

where the m distinct symbol sequences with highest importance weights are selected as the survivor paths over m$\sqrt{|\mathcal{A}'|}$ hypotheses, followed by $$w_k^{(j)}(a_{r,q}) \propto w_{i,k}^{(j)} \cdot p\left(z_{r,k} \mid \tilde{S}_{k+1}^{(j)}, s_{r,k}^{(j)} = a_{r,q}\right) P\left(s_{r,k}^{(j)} = a_{r,q}\right), \quad (36)$$

$$a_q \in A.$$

Again, m paths with highest weights are selected as the survivor paths.

At step 404, the importance weight is computed $$w_{i,k,j}^{(j)} \propto w_{k+1}^{(j)} \cdot \beta_{i,k,q}^{(j)}, \quad (37)$$

where $\beta_{i,k,q}^{(j)}$ is given by equation (31). At step 405, select and preserve only the m "best" distinct streams $\{s_{i,k}^{(j)}, \tilde{S}_{k+1}^{(j)}\}$ with the highest weights amongst the m$\sqrt{|\mathcal{A}'|}$ hypotheses with weights set $\{w_{i,k,j}^{(j)}\}$.

At step 406, the importance weight $$w_{k,j}^{(j)} \propto w_{i,k}^{(j)} \cdot \beta_{r,k,q}^{(j)}, \quad (38)$$

is computed where $\beta_{r,k,q}^{(j)}$ is given by (33). At step 407, select and preserve only the m "best" distinct streams $\{s_{r,k}^{(j)}, s_{i,k}^{(j)}, \tilde{S}_{k+1}^{(j)}\}$ with the highest weights amongst the m$\sqrt{|\mathcal{A}'|}$ hypotheses with weights set $\{w_{k,j}^{(j)}\}$.

At step 408, the a posteriori probability of the real and imaginary components of the information symbol $s_{r,k}$ and $s_{i,k}$ are computed according to equations (13) and (14) respectively.

The processing performed by the SMC demodulator, whether using stochastic SMC or deterministic SMC, may be implemented using any known hardware, firmware, and/or software. For example, the demodulator 210 in FIG. 2 may include an ASIC that is programmed to perform the desired processing. A program storage device such as a memory may tangibly embody a program of instructions that are executable by a machine such as a microprocessor. The program storage device and microprocessor may be part of, or otherwise associated with, the demodulator 210 and possibly other components in the receiver 200. Moreover, the functionality of any of the components in the receiver 200 may be implemented similarly.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for demodulating data from a channel, comprising:
   receiving a priori probability values for symbols transmitted across the channel, each symbol decomposable into a first symbol component and a second symbol component;
   in accordance with the a priori probability values, determining a first set of Monte Carlo samples of the first symbol components weighted with respect to a probability distribution of the first symbol components and determining a second set of Monte Carlo samples of the second symbol components, where the first symbol components and the second symbol components are sampled independently;
   estimating a posteriori probability values for the symbols based on the first and second sets of Monte Carlo samples, and
   wherein the weighted sets of Monte Carlo samples are determined by:
      sequentially iterating on a spatial domain of transmit antennas where the probability distribution of the first symbol components and the second symbol components is with respect to received signals after a coordinate rotation obtained by QR decomposition
      enumerating first and second symbol component samples for a first portion of the spatial domain of the transmit antennas in accordance with a deterministic computation of the probability distributions of the first and second symbol components;
      updating importance weights for the first symbol components using the enumerated first symbol component samples, preserving only a subset of sequences of first symbol components based on the importance weights for the first symbol components;
      updating importance weights for the second symbol components using the enumerated second symbol component samples, preserving only a subset of sequences of second symbol components based on the importance weights for the second symbol components;
      wherein the updating steps are performed while sequentially iterating on a second portion of the spatial domain of the transmit antennas.

2. The method of claim 1 wherein the step of determining the weighted sets of Monte Carlo samples further comprises:
   drawing the first set of Monte Carlo samples from a trial distribution specified for the first symbol components;
   updating importance weights for the first set of Monte Carlo samples based on deviations of the trial distribution specified for the first symbol components from the probability distribution of the first symbol components;
   drawing the second set of Monte Carlo samples from a trial distribution specified for the second symbol components; and updating importance weights for the second set of Monte Carlo samples based on deviations of the trial distribution specified for the second symbol components from the probability distribution of the second symbol components;

wherein the above steps are performed while sequentially iterating on a spatial domain of the transmit antennas.

3. The method of claim 2, wherein m is a number of Monte Carlo samples determined for a symbol interval and the weighted Monte Carlo samples for the first symbol components are represented by $\{(s_{r,k}^{(j)}, w_{r,k}^{(j)})\}$, and the weighted Monte Carlo samples for the second symbol components are represented $\{(s_{i,k}^{(j)}, w_{i,k}^{(j)})\}$, where the a posteriori probability value for the first symbol component is estimated by:

$$P(s_{r,k} = a_{r,q} \mid z) = E\{\prod (s_{r,k} = a_{r,q}) \mid z\}$$
$$\cong \frac{1}{W_k} \sum_{j=1}^{m} \prod (s_{r,k}^{(j)} = a_{r,q}) w_k^{(j)}, a_q \in A$$

and where the a posteriori probability value for the second symbol component is estimated by:

$$P(s_{i,k} = a_{i,q} \mid z) = E\{\prod (s_{i,k} = a_{i,q}) \mid z\}$$
$$\cong \frac{1}{W_k} \sum_{j=1}^{m} \prod (s_{i,k}^{(j)} = a_{i,q}) w_k^{(j)}, a_q \in A$$

where j is a sample index, k is an index identifying a transmit antenna, z is a vector of received signals from different transmit antennas after nulling, A is an alphabet set from which symbols take their the values, $a_i$ is an ith value in A, $W_k \triangleq \sum_{j=1}^{m} w_k^{(j)}$; and $\Pi(\cdot)$ is an indicator function.

4. The method of claim 1, wherein m is a number of Monte Carlo Samples determined for a symbol interval and the weighted Monte Carlo samples for the first symbol components are represented by $\{(s_{i,k}^{(j)}, w_{i,k}^{(j)})\}$, and the weighted Monte Carlo samples for the second symbol components are represented by $\{(s_{r,k}^{(j)}, w_{r,k}^{(j)})\}$, and where the a posteriori probability value for the first symbol component is estimated by:

$$P(s_{r,k} = a_{r,q} \mid z) = E\{\prod (s_{r,k} = a_{r,q}) \mid z\}$$
$$\cong \frac{1}{W_k} \sum_{j=1}^{m} \prod (s_{r,k}^{(j)} = a_{r,q}) w_k^{(j)}, a_q \in A$$

and where the a posteriori probability value for the second symbol component is estimated by:

$$P(s_{i,k} = a_{i,q} \mid z) = E\{\prod (s_{i,k} = a_{i,q}) \mid z\}$$
$$\cong \frac{1}{W_k} \sum_{j=1}^{m} \prod (s_{i,k}^{(j)} = a_{i,q}) w_k^{(j)}, a_q \in A$$

where j is a sample index, k is an index identifying a transmit antenna, z is a vector of received signals from different transmit antennas after nulling, A is an alphabet set from which symbols take their values, $a_i$ is an ith value in A, $W_k \triangleq \sum_{j=1}^{m} w_k^{(j)}$; and $\Pi(\cdot)$ is an indicator function.

5. The method of claim 1, wherein the first symbol component of each symbol is a real component of the symbol and wherein the second symbol component of each symbol is an imaginary component of the symbol.

6. The method of claim 1, wherein the channel is a multiple-input multiple-output system.

* * * * *